US010662936B2

(12) United States Patent
Ham et al.

(10) Patent No.: US 10,662,936 B2
(45) Date of Patent: May 26, 2020

(54) COMPRESSOR

(71) Applicant: Hanon Systems, Daejeon (KR)

(72) Inventors: Seok Jin Ham, Daejeon (KR); Min Gyu Kim, Daejeon (KR)

(73) Assignee: HANON SYSTEMS, Daejeon (KR)

(*) Notice: Subject to any disclaimer, the term of this patent is extended or adjusted under 35 U.S.C. 154(b) by 220 days.

(21) Appl. No.: 15/572,931

(22) PCT Filed: Mar. 6, 2017

(86) PCT No.: PCT/KR2017/002409
§ 371 (c)(1),
(2) Date: Mar. 20, 2018

(87) PCT Pub. No.: WO2017/164539
PCT Pub. Date: Sep. 28, 2017

(65) Prior Publication Data
US 2018/0195505 A1 Jul. 12, 2018

(30) Foreign Application Priority Data

Mar. 23, 2016 (KR) .................. 10-2016-0034804

(51) Int. Cl.
*F04B 39/16* (2006.01)
*F04B 39/02* (2006.01)
(Continued)

(52) U.S. Cl.
CPC .............. *F04B 39/16* (2013.01); *F04B 39/02* (2013.01); *F04B 39/0284* (2013.01);
(Continued)

(58) Field of Classification Search
CPC ...... F04B 39/16; F04B 39/0284; F04B 39/02; F04B 39/04; F04B 53/20; F04B 2205/50;
(Continued)

(56) References Cited

U.S. PATENT DOCUMENTS 5,031,416 A * 7/1991 Drucker .................. F25B 41/06
62/324.1
2003/0230098 A1* 12/2003 Moon ....................... F25B 1/10
62/175
(Continued)

FOREIGN PATENT DOCUMENTS

JP H0321578 3/1991
JP 2004211550 7/2004
(Continued)

OTHER PUBLICATIONS

International Search Report for PCT Application No. PCT/KR2017/002409 dated Jun. 7, 2017.

*Primary Examiner* — Devon C Kramer
*Assistant Examiner* — Christopher J Brunjes
(74) *Attorney, Agent, or Firm* — Carlson, Gaskey & Olds, P.C.

(57) ABSTRACT

A compressor includes a compression mechanism configured to suck and compress a refrigerant from a suction space to discharge the refrigerant to a discharge space by a driving force transmitted thereto. The compressor includes an oil storage chamber provided in the discharge space to collect oil separated from the refrigerant discharged from the compression mechanism, an oil recovery passage configured to guide the oil in the oil storage chamber to the suction space, and a decompression mechanism provided in the oil recovery passage to reduce a pressure of the oil passing through the oil recovery passage by an orifice hole having an inner diameter smaller than the oil recovery passage. The decompression mechanism is configured such that, when a pressure in the oil storage chamber is increased, the inner diameter of the orifice hole is reduced.

8 Claims, 8 Drawing Sheets

(51) Int. Cl.

| | |
|---|---|
| *F04B 53/20* | (2006.01) |
| *F16K 47/04* | (2006.01) |
| *F04B 39/04* | (2006.01) |
| *F04C 29/00* | (2006.01) |
| *F04C 18/344* | (2006.01) |
| *F04C 18/02* | (2006.01) |
| *F04C 18/356* | (2006.01) |
| *F04C 29/02* | (2006.01) |
| *F25B 31/00* | (2006.01) |

(52) U.S. Cl.
CPC ............... *F04B 39/04* (2013.01); *F04B 53/20* (2013.01); *F04C 18/0207* (2013.01); *F04C 18/344* (2013.01); *F04C 18/356* (2013.01); *F04C 29/0092* (2013.01); *F04C 29/028* (2013.01); *F16K 47/04* (2013.01); *F25B 31/004* (2013.01); *F04B 2205/50* (2013.01); *F04C 29/026* (2013.01); *F04C 2240/809* (2013.01); *Y10T 137/7896* (2015.04); *Y10T 137/8085* (2015.04)

(58) Field of Classification Search
CPC ............... F04B 53/1072; F25B 31/004; F04C 29/0092; F04C 29/028; F04C 29/026; F04C 18/344; F04C 18/0207; F04C 18/356; F04C 2240/809; Y10T 137/7896; Y10T 137/8085; F16K 47/04; F16K 47/08; F16K 1/52

USPC .............................................. 251/120, 33, 37
See application file for complete search history.

(56) References Cited

U.S. PATENT DOCUMENTS

| | | | |
|---|---|---|---|
| 2008/0302128 | A1 | 12/2008 | Park et al. |
| 2011/0113819 | A1* | 5/2011 | Matsumoto ............. F25B 43/02 62/470 |
| 2012/0103003 | A1* | 5/2012 | Hokazono ............... F25B 13/00 62/401 |
| 2013/0074537 | A1* | 3/2013 | Rollinger ............. B60H 1/3216 62/228.1 |
| 2013/0287618 | A1* | 10/2013 | Ishikawa ................. F04B 39/02 418/97 |

FOREIGN PATENT DOCUMENTS

| | | |
|---|---|---|
| JP | 2007032511 A | 2/2007 |
| JP | 2012132408 | 7/2012 |
| KR | 20060119490 A | 11/2006 |
| KR | 101058706 | 8/2011 |
| KR | 20130121330 A | 11/2013 |

* cited by examiner

COMPRESSOR

REFERENCE TO RELATED APPLICATIONS

This application is a United States National Phase application of PCT/KR2017/002409 filed on Mar. 6, 2017, which claims priority to Korean Application No. 10-2016-0034804 filed on Mar. 23, 2016.

TECHNICAL FIELD

The present invention relates to a compressor, and more particularly, to a compressor capable of separating oil from a refrigerant, which is compressed and discharged, and decompressing and recovering the separated oil.

BACKGROUND ART

In general, a compressor serving to compress a refrigerant in a vehicle cooling system has been developed in various forms. The compressor includes a reciprocating compressor that compresses a refrigerant during reciprocation and a rotary compressor that compresses a refrigerant during rotation.

The reciprocating compressor includes a crank compressor that transmits driving force from a drive source to a plurality of pistons using a crank, a swash plate compressor that transmits driving force from a drive source to a rotary shaft equipped with a swash plate, and a wobble plate compressor that uses a wobble plate. The rotary compressor includes a vane rotary compressor that uses a rotary shaft and a vane, and a scroll compressor that uses an orbiting scroll and a fixed scroll.

In the compressor, a sliding part is lubricated with oil, and the oil is separated and recovered from a compressed refrigerant and is then resupplied to the sliding part since the oil is mixed with the refrigerant.

That is, a conventional compressor includes a compression mechanism that sucks a refrigerant from a suction space by diving force transmitted thereto and compresses the refrigerant to discharge it to a discharge space, an oil storage chamber that is provided in the discharge space to collect oil separated from the refrigerant discharged from the compression mechanism, and an oil recovery passage that guides the oil in the oil storage chamber to the suction space.

Here, the oil storage chamber is a high-pressure region and the suction space is a low-pressure region. Therefore, it is possible to prevent a deterioration in compressor performance and a power loss only if oil is sufficiently decompressed when the oil is introduced into the suction space through the oil recovery passage.

Accordingly, in the conventional compressor, the oil recovery passage is provided with a decompression mechanism that reduces the pressure of the oil passing through the oil recovery passage by an orifice hole having an inner diameter smaller than the oil recovery passage.

FIG. 1 is a perspective view illustrating a decompression mechanism in a conventional compressor. FIG. 2 is a cross-sectional view illustrating a state in which the decompression mechanism of FIG. 1 is mounted to the compressor.

Referring to FIGS. 1 and 2, a conventional decompression mechanism 58 includes an orifice member 582 formed with an orifice hole 582$d$.

The orifice member 582 has a tubular shape and include the orifice hole 582$d$ formed at the center side thereof to pass through the orifice member 582.

The orifice member 582 is made of a rigid material such as copper with a predetermined rigidity such that the length and inner diameter of the orifice hole 582$d$ are a predetermined value. Here, the length and inner diameter of the orifice hole 582$d$ are factors that determine a decompression capacity of the orifice member 582. The decompression capacity of the orifice member 582 is increased as the length of the orifice hole 582$d$ is long and the inner diameter of the orifice hole 582$d$ is short.

However, in the conventional compressor including the decompression mechanism 58, if the pressure in an oil storage chamber 54 is increased, the oil recovered from the oil storage chamber 54 to a suction space S1 is not sufficiently decompressed, which may lead to a deterioration in compressor performance and a power loss. In more detail, the pressure of the refrigerant discharged from a compression mechanism (not shown) is irregular, and may be higher than a predetermined pressure value. Thus, the pressure in the oil storage chamber 54 may be higher than a predetermined pressure value. However, since the length and inner diameter of the orifice hole 582$d$ are fixed to be a predetermined value, the decompression capacity of the decompression mechanism 58 (more exactly, the orifice member 582) is fixed. Accordingly, when the pressure in the oil storage chamber 54 is higher than a predetermined pressure value, the pressure of the oil passing through the decompression mechanism 58 is higher than a predetermined pressure value. That is, as the pressure in the oil storage chamber 54 is increased, the flow rate of oil passing through the decompression mechanism 58 is increased, with the consequence that the oil, which is not sufficiently decompressed, is introduced into the suction space S1. Hence, the pressure in the suction space S1 is higher than a predetermined pressure value, resulting in a deterioration in compressor performance and a power loss.

DISCLOSURE

Technical Problem

Accordingly, the present invention has been made in view of the above-mentioned problems, and an object thereof is to provide a compressor capable of sufficiently decompressing oil recovered to a suction space from a discharge space even when the pressure in the discharge space is increased.

Technical Solution

In accordance with one aspect of the present invention, a compressor includes a compression mechanism configured to suck and compress a refrigerant from a suction space to discharge the refrigerant to a discharge space by driving force transmitted thereto, an oil storage chamber provided in the discharge space to collect oil separated from the refrigerant discharged from the compression mechanism, an oil recovery passage configured to guide the oil in the oil storage chamber to the suction space, and a decompression mechanism provided in the oil recovery passage to reduce a pressure of the oil passing through the oil recovery passage by an orifice hole having an inner diameter smaller than the oil recovery passage. The decompression mechanism is configured such that, when a pressure in the oil storage chamber is increased, the inner diameter of the orifice hole is reduced.

The decompression mechanism may include an orifice member having the orifice hole formed therein, and the orifice member may be made of an elastic material.

When the pressure in the oil storage chamber is within a predetermined first pressure range, the orifice member may be a single orifice member, whereas when the pressure in the oil storage chamber is within a predetermined second pressure range higher than the first pressure range, the orifice member may consist of a plurality of orifice members.

The plurality of orifice members may be arranged in an extension direction of orifice holes, and the orifice holes of the plurality of orifice members may communicate with each other.

The orifice member may include a first tip surface having an annular shape, a second tip surface having an annular shape and forming a back surface of the first tip surface, an outer peripheral surface connecting an outer peripheral portion of the first tip surface to an outer peripheral portion of the second tip surface, and an inner peripheral surface connecting an inner peripheral portion of the first tip surface to an inner peripheral portion of the second tip surface, and forming the orifice hole. The first tip surface may be positioned upstream of the oil recovery passage, the second tip surface may be positioned downstream of the oil recovery passage, and at least one of the second tip surface and the outer peripheral surface may be fixedly supported.

The decompression mechanism may further include a filter member configured to separate foreign substances from the oil introduced into the orifice hole and a support member configured to fix the filter member to the orifice member. The support member may include a first support member configured to cover the first tip surface of the orifice member. The filter member is installed to the first support member and a second support member coupled to the first support member to support the second tip surface and the outer peripheral surface of the orifice member.

The first and second support members may be detachably formed, and the second support member may be configured such that the orifice member is inserted into the second support member from the first support member.

The decompression mechanism may further include a filter member configured to separate foreign substances from the oil introduced into the orifice hole and a support member configured to fix the filter member to the orifice member. The support member may include a first portion configured to cover the first tip surface of the orifice member. The filter member is installed to the first portion and a second portion extending from the first portion and supporting the outer peripheral surface of the orifice member.

The first and second portions may be formed integrally, and the second portion may be configured such that the orifice member is inserted into the second portion from an opposite side of the first portion.

The second tip surface of the orifice member may be supported by a valve of the compression mechanism.

The outer peripheral surface of the orifice member may be supported by an inner wall of the oil recovery passage, and the second tip surface of the orifice member may be supported by a valve of the compression mechanism.

In accordance with another aspect of the present invention, a compressor includes an oil recovery passage (56) configured to recover oil separated from a refrigerant and a decompression mechanism (58) configured to reduce a pressure of the oil passing through the oil recovery passage (56) by an orifice hole (582*d*). The decompression mechanism (58) is configured such that an inner diameter of the orifice hole (582*d*) varies depending on the pressure of the oil introduced into the orifice hole (582*d*).

Advantageous Effects

A compressor according to the present invention includes an oil recovery passage that recovers oil to a suction space from an oil storage chamber in a discharge space and a decompression mechanism that reduces the pressure of the oil passing through the oil recovery passage. The decompression mechanism has an orifice hole, the inner diameter of which varies depending on the pressure in the oil storage chamber. Accordingly, it is possible to sufficiently decompress the oil recovered to the suction space from the discharge space even when the pressure in the discharge space is increased. Meanwhile, the pressure of the refrigerant discharged from a compression mechanism is irregular and may be higher than a predetermined pressure value. Thus, the pressure in the oil storage chamber may be higher than a predetermined pressure value. Therefore, the orifice hole of the decompression mechanism according to the present invention is configured such that the inner diameter of the orifice hole is reduced when the pressure in the oil storage chamber is increased. Accordingly, when the pressure in the oil storage chamber is increased, a decompression capacity of the decompression mechanism can be improved and the pressure of the oil passing through the decompression mechanism can be reduced compared to when the inner diameter of the orifice hole is fixed. That is, it is possible to reduce a flow rate of oil passing through the decompression mechanism and prevent introduction of oil, which is not sufficiently decompressed, into the suction space even though the pressure in the oil storage chamber is increased. Therefore, the pressure in the suction space can be maintained at a predetermined pressure value, with the consequence that it is possible to prevent a deterioration in compressor performance and a power loss.

BEST MODE FOR INVENTION

A compressor according to exemplary embodiments of the present invention will be described below in detail with reference to the accompanying drawings.

Figure 1:
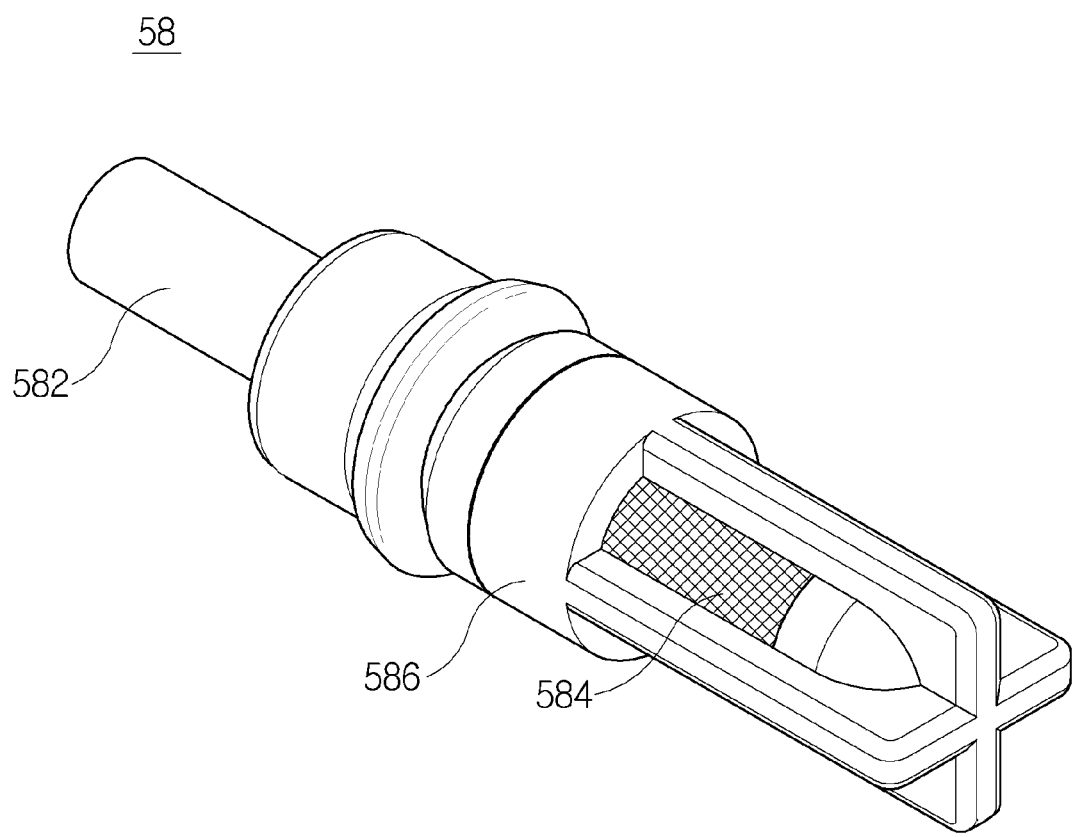
FIG. 1 a perspective view illustrating a decompression mechanism in a conventional compressor.
Figure 2:
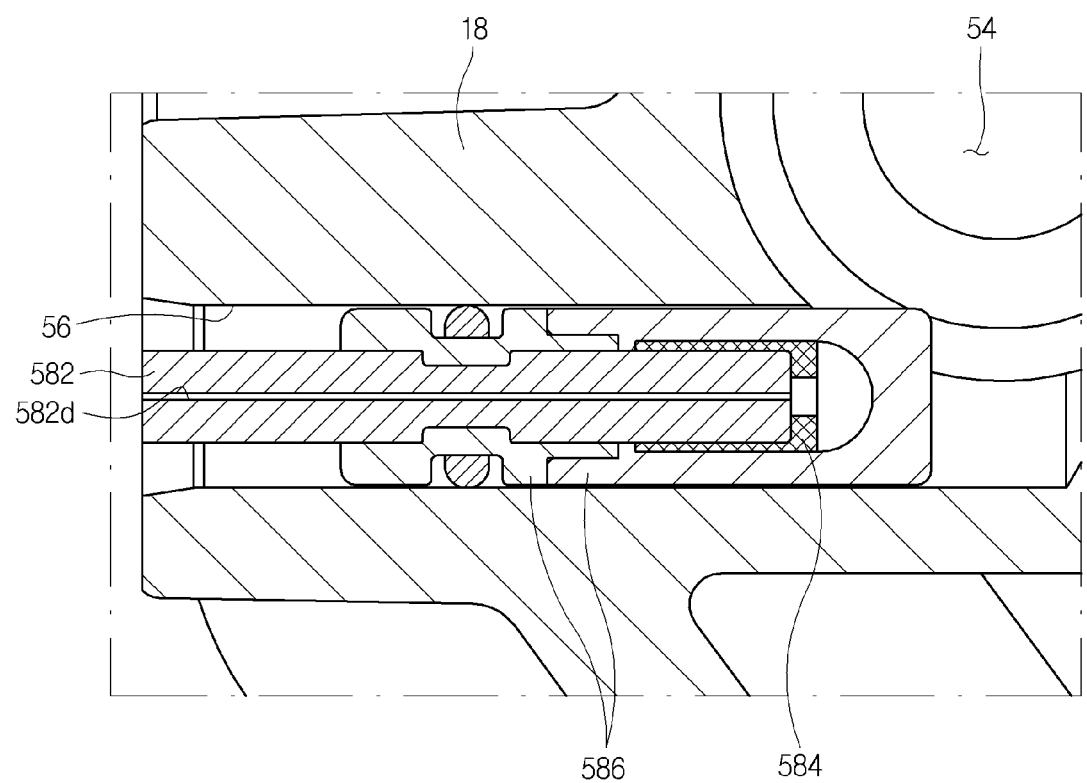
FIG. 2 is a cross-sectional view illustrating a state in which the decompression mechanism of FIG. 1 is mounted to the compressor.
Figure 3:
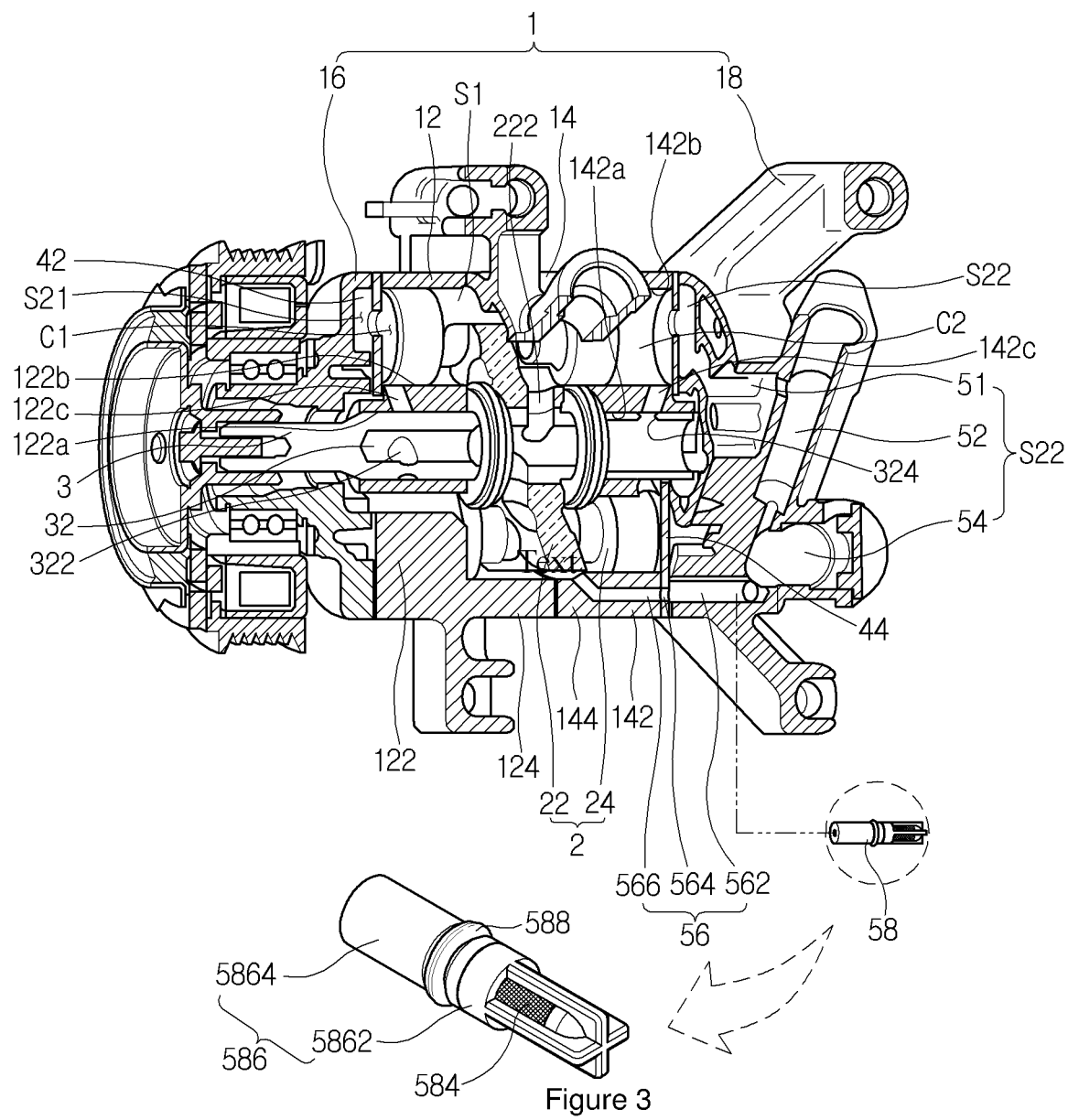
FIG. 3 is a perspective view illustrating a compressor according to an embodiment of the present invention.
Figure 4:
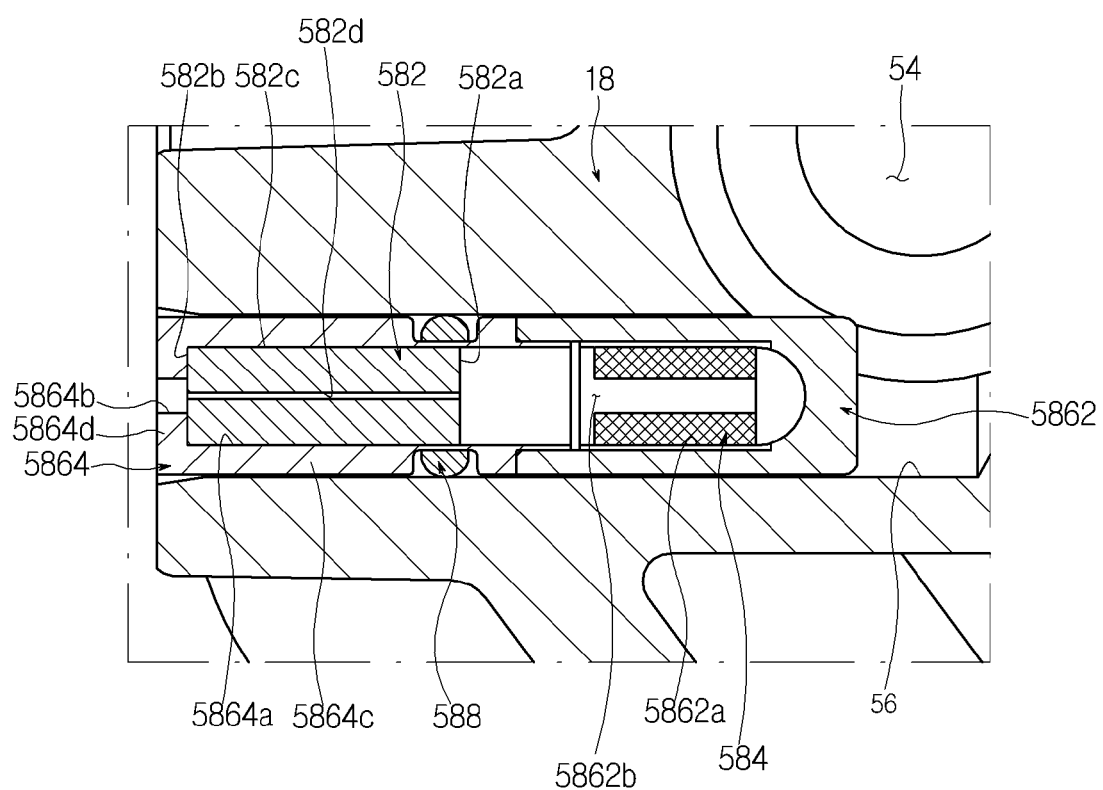
FIG. 4 is a cross-sectional view illustrating a state in which a decompression mechanism of FIG. 3 is mounted to the compressor.
Figure 5:
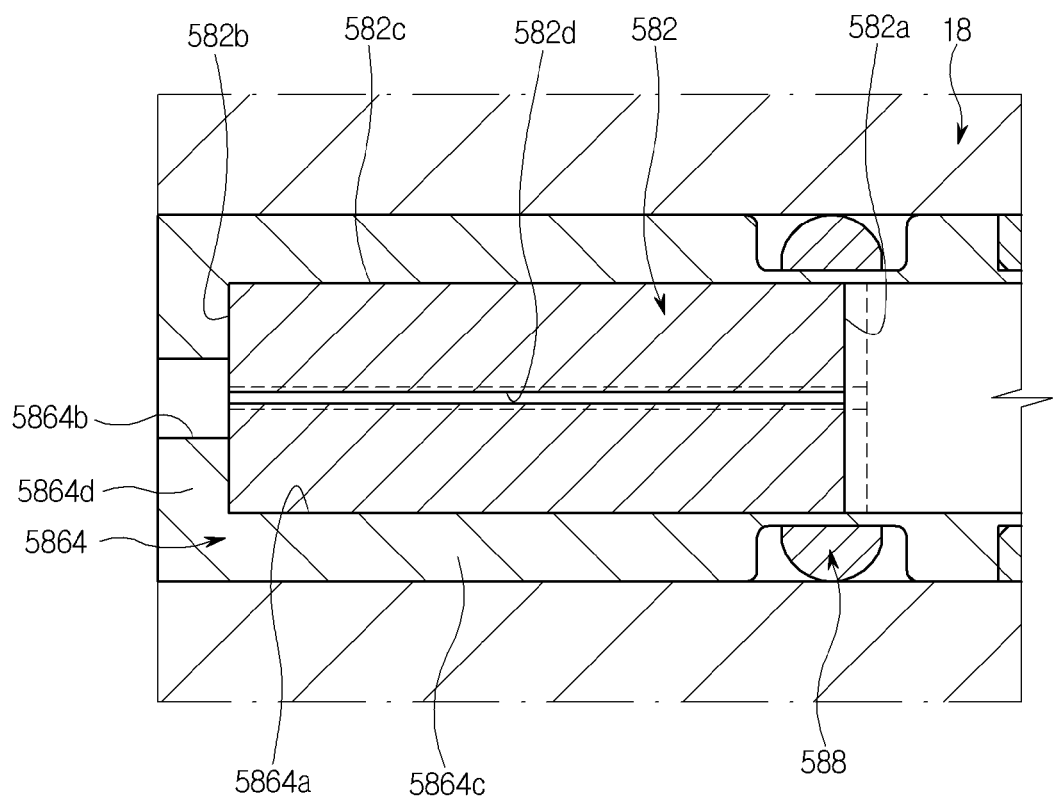
FIG. 5 is a cross-sectional view illustrating a state in which an orifice member of FIG. 4 is deformed by an increase in pressure in an oil storage chamber so that an inner diameter of an orifice hole is reduced.

FIG. 3 is a perspective view illustrating a compressor according to an embodiment of the present invention. FIG. 4 is a cross-sectional view illustrating a state in which a decompression mechanism of FIG. 3 is mounted to the compressor. FIG. 5 is a cross-sectional view illustrating a state in which an orifice member of FIG. 4 is deformed by an increase in pressure in an oil storage chamber so that an inner diameter of an orifice hole is reduced.

Referring to FIGS. 3 to 5, the compressor according to the embodiment of the present invention may include a casing 1 having an internal space, a compression mechanism 2 that is provided in the casing 1 to compress a refrigerant, and a rotary shaft 3, one side of which is coupled to a drive source (for instance, a vehicle engine) (not shown) provided outside the casing 1 while the other side of the rotary shaft 3 is coupled to the compression mechanism 2 to transmit the power of the drive source to the compression mechanism 2.

The casing 1 may include a cylinder block 12, 14 that accommodates the compression mechanism 2, a front casing 16 that is coupled to the front of the cylinder block 12, 14, and a rear casing 18 that is coupled to the rear of the cylinder block 12, 14.

The cylinder block 12, 14 may include a first cylinder block 12 and a second cylinder block 14 which are coupled to each other.

The first cylinder block 12 may include a first cylindrical part 122 that has a cylindrical shape and a first annular part 124 that protrudes from the outer peripheral portion of the first cylindrical part 122 to the second cylinder block 14.

The first cylindrical part 122 may have a first bearing hole 122a formed in the center side thereof for insertion of the rotary shaft 3 and a first bore 122b formed in the outer peripheral portion thereof for insertion of one end of a piston 24 to be described later.

The first bearing hole 122a may have a cylindrical shape and pass through the first cylinder block 12 in the axial direction of the first cylinder block 12.

The first bore 122b may have a cylindrical shape and pass through the first cylinder block 12 in the axial direction of the first cylinder block 12 at a position spaced radially outward of the first cylinder block 12 from the first bearing hole 122a.

The first bore 122b may consist of a plurality of first bores, in which case the plurality of first bores 122b may be arranged in the circumferential direction of the first cylinder block 12 with respect to the first bearing hole 122a.

The first cylindrical part 122 may have a first refrigerant supply hole 122c through which the first bearing hole 122a communicates with the first bore 122b.

The first refrigerant supply hole 122c may pass through the first cylindrical part 122 from the inner peripheral surface of the first bearing hole 122a to the inner peripheral surface of the first bore 122b.

The first refrigerant supply hole 122c may be configured such that each of the plurality of first bores 122b communicates with the first bearing hole 122a.

The second cylinder block 14 may be symmetrical to the first cylinder block 12.

That is, the second cylinder block 14 may include a second cylindrical part 142 that has a cylindrical shape and a second annular part 144 that protrudes from the outer peripheral portion of the second cylindrical part 142 to the first cylinder block 12.

The second cylindrical part 142 may have a second bearing hole 142a formed in the center side thereof for insertion of the rotary shaft 3 passing through the first bearing hole 122a and a second bore 142b formed in the outer peripheral portion thereof for insertion of the other end of the piston 24 inserted into the first bore 122b.

The second bearing hole 142a may have a cylindrical shape and pass through the second cylinder block 14 in the axial direction of the second cylinder block 14.

The second bore 142b may have a cylindrical shape and pass through the second cylinder block 14 in the axial direction of the second cylinder block 14 at a position spaced radially outward of the second bearing hole 142a from the second bearing hole 142a.

The second bore 142b may consist of a plurality of second bores corresponding to the number of first bores 122b, in which case the plurality of second bores 142b may be arranged in the circumferential direction of the second cylinder block 14 with respect to the second bearing hole 142a.

The second cylindrical part 142 may have a second refrigerant supply hole 142c through which the second bearing hole 142a communicates with the second bore 142b.

The second refrigerant supply hole 142c may pass through the second cylindrical part 142 from the inner peripheral surface of the second bearing hole 142a to the inner peripheral surface of the second bore 142b.

The second refrigerant supply hole 142c may be configured such that each of the plurality of second bores 142b communicates with the second bearing hole 142a.

Here, the first and second cylinder blocks 12 and 14 may be configured such that the first annular part 124 is fastened to the second annular part 144 to define a swash plate chamber S1 between the first cylindrical part 122 and the second cylindrical part 142.

The swash plate chamber S1 may accommodate a swash plate 22, which will be described later, therein.

The piston 24 may pass through the swash plate chamber S1, and be coupled to the swash plate 22 at the side of the swash plate chamber S1. One end of the piston 24 is inserted into the first bore 122b and the other end thereof is inserted into the second bore 142b.

Meanwhile, the swash plate chamber S1 may communicate with a suction pipe (not shown) for guiding a refrigerant to be compressed into the casing 1 and may function as a refrigerant suction space S1. Hereinafter, the swash plate chamber S1 and the refrigerant suction space S1 will be used together for description.

The front casing 16 may be fastened to the first cylinder block 12 to cover the first cylindrical part 122 at the opposite side of the second cylinder block 14 with respect to the first cylinder block 12.

The front casing 16 may be provided with a first discharge space S21 to accommodate the refrigerant discharged from the first bore 122b.

The first discharge space S21 may communicate with a discharge pipe (not shown) for guiding the compressed refrigerant out of the casing 1.

A first valve 42 may be interposed between the first cylinder block 12 and the front casing 16 for selective communication between the first bore 122b and the first discharge space S21.

The first valve 42 may cover an opening in the first discharge space S21 of the first bore 122b to define a first compression space C1 together with the first bore 122b and the piston 24.

The first valve 42 may be, for example, a leaf spring type valve. The first valve 42 may be opened and closed such that, when the pressure in the first compression space C1 is equal to or greater than a predetermined value, the first compression space C1 communicates with the first discharge space S21 to discharge the compressed refrigerant from the first compression space C1 to the first discharge space S21. When the pressure in the first compression space C1 is less than the predetermined value, the flow of refrigerant is prevented between the first compression space C1 and the first discharge space S21 by blocking the first compression space C1 and the first discharge space S21.

The rear casing 18 may be fastened to the second cylinder block 14 to cover the second cylindrical part 142 at the opposite side of the first cylinder block 12 with respect to the second cylinder block 14.

The rear casing 18 may be provided with a second discharge space S22 to accommodate the refrigerant discharged from the second bore 142b.

The second discharge space S22 may communicate with a discharge pipe (not shown) for guiding the compressed refrigerant out of the casing 1. Here, the first discharge space S21 communicates with the second discharge space S22, and the discharge pipe communicates with the second discharge space S22 so that the refrigerant in the first discharge space S21 may be mixed with the refrigerant in the second discharge space S22 and then be guided out of the casing 1 thorough the discharge pipe.

A second valve 44 may be interposed between the second cylinder block 14 and the rear casing 18 for selective communication between the second bore 142b and the second discharge space S22.

The second valve 44 may cover an opening in the second discharge space S22 of the second bore 142b to define a second compression space C2 together with the second bore 142b and the piston 24.

The second valve 44 may be, for example, a leaf spring type valve. The second valve 44 may be opened and closed such that, when the pressure in the second compression space C2 is equal to or greater than a predetermined value, the second compression space C2 communicates with the second discharge space S22 to discharge the compressed refrigerant from the second compression space C2 to the second discharge space S22. When the pressure in the second compression space C2 is less than the predetermined value, the flow of refrigerant is prevented between the second compression space C2 and the second discharge space S22 by blocking the second compression space C2 and the first discharge space S22.

The compression mechanism 2 may include the swash plate 22 that is obliquely fastened to the rotary shaft 3 and rotates along with the rotary shaft 3, and the piston 24 that is accommodated in the first and second bores 122b and 142b and is coupled to the swash plate 22 to reciprocate in the first and second bores 122b and 142b by the rotation of the swash plate 22.

The swash plate 22 may have a disc shape and be obliquely fastened to the rotary shaft 3 in the swash plate chamber S1 of the cylinder block 12, 14.

The swash plate 22 may have a refrigerant pass hole 222 through which the swash plate chamber S1 of the cylinder block 12, 14 communicates with a refrigerant passage 32, which will be described later, of the rotary shaft 3 to guide the refrigerant introduced into the swash plate chamber S1 of the cylinder block 12, 14 to the refrigerant passage 32 of the rotary shaft 3.

The piston 24 may have a cylindrical shape, and may pass through the swash plate chamber S1 of the cylinder block 12, 14. One end of the piston 24 may be inserted into the first bore 122b and the other end thereof may be inserted into the second bore 142b. That is, the piston 24 may consist of a plurality of pistons, in which case the ends of each piston 24 are respectively inserted into one of the plurality of first bores 122b and one of the plurality of second bores 142b.

The piston 24 may be coupled to the outer peripheral portion of the swash plate 22 to be movable relative thereto in the intermediate portion of the swash plate chamber S1 of the cylinder block 12, 14. That is, the swash plate 22 may be coupled to the piston 24 to be rotatable relative thereto.

The rotary shaft 3 may have a cylindrical shape and extend in one direction.

One end of the rotary shaft 3 may be inserted into and rotatably supported by the cylinder block 12, 14 (more exactly, the first and second bearing holes 122a and 142a), the other end thereof may protrude out of the casing 1 through the front casing 16 and be connected to the drive source.

The refrigerant passage 32 may be formed in the rotary shaft 3 to guide the refrigerant introduced from the refrigerant pass hole 222 of the swash plate 22 to the first and second refrigerant supply holes 122c and 142c of the cylinder block 12, 14.

Here, the refrigerant passage 32 may include a first outlet 322 that selectively communicates with the first refrigerant supply hole 122c and a second outlet 324 that selectively communicates with the second refrigerant supply hole 142c.

The first outlet 322 may pass through one side of the rotary shaft 3 from the refrigerant passage 32 to the outer peripheral surface of the rotary shaft 3 so as to communicate with a first refrigerant supply hole 122c in an intake stroke from among a plurality of first refrigerant supply holes 122c according to the rotation of the rotary shaft 3.

The second outlet 324 may pass through the other side of the rotary shaft 3 from the refrigerant passage 32 to the outer peripheral surface of the rotary shaft 3 so as to communicate with a second refrigerant supply hole 142c in an intake stroke from among a plurality of second refrigerant supply holes 142c according to the rotation of the rotary shaft 3.

In the compressor of the present embodiment having the above-mentioned structure, the rotary shaft 3 and the swash plate 22 may rotate together when power is transmitted from the drive source to the rotary shaft 3.

The piston 24 may convert the rotary motion of the swash plate 22 into rectilinear motion to reciprocate in the cylinder block 12, 14 (more exactly, the first and second bores 122b and 142b).

Accordingly, a refrigerant may be introduced into and compressed in the first and second compression spaces C1 and C2 through the suction pipe, the suction space S1 of the cylinder block 12, 14, the refrigerant pass hole 222, the refrigerant passage 32, and the first and second refrigerant supply holes 122c and 142c, and then be discharged to the first and second discharge spaces S21 and S22. The refrigerant discharged to the first and second discharge spaces S21 and S22 may be discharged out of the casing 1 through the discharge pipe.

In this process, sliding parts (for instance, between the rotary shaft 3 and the cylinder block 12, 14, between the piston 24 and the cylinder block 12, 14, etc.) of the compressor are lubricated with oil, in which case a series of processes may be repeated in which oil is mixed with a refrigerant to lubricate the sliding parts while moving to the suction space S1 and the compression and discharge spaces together with the refrigerant, is separated from the refrigerant in the discharge space, and is recovered to the swash plate chamber S1.

For circulation of such oil, the compressor of the present embodiment may include an oil circulation system.

The oil circulation system may include an oil separator 52 that separates oil from a refrigerant, an oil storage chamber 54 that collects the oil separated by the oil separator 52, an oil recovery passage 56 that serves to guide the oil in the oil storage chamber 54 to the suction space S1, and a decompression mechanism 58 that is provided in the oil recovery passage 56 to reduce the pressure of the oil passing through the oil recovery passage 56.

The oil separator 52 and the oil storage chamber 54 are formed in the rear casing 18 and may be formed by partitioning the second discharge space S22. That is, the second discharge space S22 may be partitioned into a discharge chamber 51 that collects the refrigerant and oil discharged from the compression mechanism 2, the oil separator 52 that communicates with the discharge chamber 51 and the discharge pipe, and the oil storage chamber 54 that communicates with the oil separator 52.

The oil separator 52 may be a cylindrical space that extends in an inclined direction to gravity and may communicate with the discharge chamber 51 at one side of the inner peripheral surface thereof. One end of the oil separator 52, which is positioned in an opposite direction of gravity, may communicate with the discharge pipe, and the other end of the oil separator 52, which is positioned in a gravity direction, may communicate with the oil storage chamber 54.

The oil storage chamber 54 may be positioned in the gravity direction with respect to the oil separator 52 such that the oil separated by the oil separator 52 is collected in the oil storage chamber 54 by gravity.

The oil recovery passage 56 may include a first passage 562 that passes through the rear casing 18 from the oil storage chamber 54 to the second valve 44, a third passage 566 that passes through the second cylinder block 14 from the suction space S1 to the second valve 44, and a second passage 564 that passes through the second valve 44 such that the first passage 562 communicates with the third passage 566.

The decompression mechanism 58 may include an orifice member 582 that is formed with an orifice hole 582d having an inner diameter smaller than the oil recovery passage 56, a filter member 584 that separates foreign substances from the oil introduced into the orifice hole 582d to prevent the orifice hole 582d from clogging due to foreign substances, and a support member 586 that fixes the filter member 584 to the orifice member 582.

The orifice member 582 may have a tubular shape and have the orifice hole 582d formed in the center side thereof. That is, the orifice member 582 may have a first tip surface 582a having an annular shape, a second tip surface 582b that has an annular shape and forms the back surface of the first tip surface 582a, an outer peripheral surface 582c that connects the outer peripheral portion of the first tip surface 582a to the outer peripheral portion of the second tip surface 582b, and an inner peripheral surface 582d that connects the inner peripheral portion of the first tip surface 582a to the inner peripheral portion of the second tip surface 582b and forms the orifice hole 582d.

The first tip surface 582a is positioned upstream of the oil recovery passage 56 and may apply pressure to the oil introduced into the oil storage chamber 54.

The second tip surface 582b is positioned downstream of the oil recovery passage 56, and may come into contact with a second wall 5864d, which will be described later, of the support member 586.

The outer peripheral surface 582c may come into contact with a first wall 5864c, which will be described later, of the support member 586.

The orifice member 582 may be made of an elastic material such as rubber such that the inner diameter of the orifice hole 582d varies by deformation and restoration of the orifice member 582 according to the pressure in the oil storage chamber 54.

The orifice member 582 is made of an elastic material, and therefore, if the length of the orifice member 582 (the length of the orifice hole 582d), which is a distance between the first tip surface 582a and the second tip surface 582b, is longer than a predetermined length, it may be difficult to manufacture it. That is, if the length of the orifice member 582 (the length of the orifice hole 582d) is longer than a predetermined length, it may be difficult for the orifice hole 582d to have a predetermined shape. Accordingly, the orifice member 582 according to the present embodiment may be configured such that the length of the orifice member 582 (the length of the orifice hole 582d) is smaller than or equal to thirty times the inner diameter of the orifice hole 582d. Meanwhile, the decompression capacity of the orifice member 582 is improved as the length of the orifice hole 582d is long, and when the orifice member 582 is deformed and restored, the inner diameter of the orifice hole 582d easily varies as the length of the orifice member 582 is long. Therefore, it may be preferable that the orifice member 582 not be formed too short. Accordingly, the orifice member 582 may be configured such that length of the orifice member 582 (the length of the orifice hole 582d) is equal to or greater than ten times the inner diameter of the orifice hole 582d.

The filter member 584 may be, for example, a mesh filter.

The support member 586 may be configured to support the orifice member 582 while fixing the filter member 584 to the orifice member 582.

In more detail, the support member 586 may include a first support member 5862 which covers the first tip surface 582a of the orifice member 582 at the upstream side of the oil recovery passage 56 and to which the filter member 584 is installed and a second support member 5864 that is coupled to the first support member 5862 and is fixed to the orifice member 582 at the downstream side of the oil recovery passage 56.

The first support member 5862 may have a cylindrical shape to be insertable into the oil recovery passage 56. The first support member 5862 may have an oil inlet 5862a that is formed in the outer peripheral portion thereof for introduction of oil and an oil storage space 5862b that is formed in the center side thereof to temporarily store the oil passing through the oil inlet 5862a.

The oil inlet 5862a may be covered by the filter member 584, and the oil storage space 5862b may communicate with a first through-hole 5864a, which will be described later, of the second support member 5864.

Here, the oil storage space 5862b is a space facing the first tip surface 582a of the orifice member 582 and may serve as a pressure space in which the oil stored in the oil storage space 5862b applies pressure to the first tip surface 582a of the orifice member 582.

The second support member 5864 may have a cylindrical shape to be insertable into the oil recovery passage 56. The second support member 5864 may have through-holes 5864a and 5864b that are formed in the center side thereof and pass through the second support member 5864 in the axial direction of the second support member 5864.

The through-holes 5864a and 5864b may include a first through-hole 5864a that is positioned upstream of the oil recovery passage 56 and a second through-hole 5864b that is positioned downstream of the oil recovery passage 56.

The first through-hole 5864*a* may communicate with the oil storage space 5862*a* at the upstream side thereof, and may communicate with the second through-hole 5864*b* at the downstream side thereof.

The first through-hole 5864*a* may have an outer diameter that is nearly equal to the outer diameter of the orifice member 582 such that the orifice member 582 is inserted into the first through-hole 5864*a*.

The second through-hole 5864*b* may communicate with the first through-hole 5864*a* at the upstream side thereof and may communicate with the downstream of the oil recovery passage 56 at the downstream side thereof.

The second through-hole 5864*b* may be stepped with the first through-hole 5864*a*, such that the oil passing through the orifice hole 582*d* of the orifice member 582 inserted into the first through-hole 5864*a* is guided downstream of the oil recovery passage 56 and so as to prevent the orifice member 582 from being separated downstream of the oil recovery passage 56 from the first through-hole 5864*a*. That is, the second through-hole 5864*b* may have an inner diameter smaller than the inner diameter of the first through-hole 5864*a*.

Here, assuming that the formation portion of the first through-hole 5864*a* is referred to as a first wall 5864*c* and the formation portion of the second through-hole 5864*b* is referred to as a second wall 5864*d*, the first wall 5864*c* may be coupled to the first support member 5862 while supporting the outer peripheral surface 582*c* of the orifice member 582, and the second wall 5864*d* may support the second tip surface 582*b* of the orifice member 582.

The support member 586 is configured such that the first support member 5862 covers the first tip surface 582*a* of the orifice member 582 and the second support member 5864 supports both of the second tip surface 582*b* and the outer peripheral surface 582*c* of the orifice member 582. Therefore, if the first and second support members 5862 and 5864 are formed integrally with each other, the orifice member 582 may not be inserted into the support member 586 (more exactly, the first through-hole). Accordingly, the first and second support members 5862 and 5864 are detachably formed, and the second support member 5864 is configured such that the orifice member 582 is insertable into the second support member 5864 (more exactly, the first through-hole 5864*a*) from the first support member 5862.

In addition, the support member 586 may include a sealing member 588 on the outer peripheral surface 582*c* thereof. The sealing member 588 may be interposed between the support member 586 and the oil recovery passage 56 to prevent oil from leaking between the support member 586 and the oil recovery passage 56, and may fix the support member 586 at a predetermined position on the oil recovery passage 56.

In the oil circulation system having the above-mentioned structure, the refrigerant and oil discharged to the discharge chamber 51 from the compression mechanism 2 are introduced into the oil separator 52, and the refrigerant and oil introduced into the oil separator 52 may be separated from each other while moving in a cyclone fashion along the inner peripheral surface of the oil separator 52. That is, oil contained in refrigerant may be adsorbed onto the inner peripheral surface of the oil separator 52 to be separated from the refrigerant, and the separated oil may move to the other end of the oil separator 52 by gravity to be collected in the oil storage chamber 54. The oil collected in the oil storage chamber 54 may be recovered to the suction space S1 through the oil recovery passage 56 from the oil storage chamber 54 by a difference in pressure between the oil storage chamber 54 and the suction space S1. In this case, the decompression mechanism 58 may prevent a deterioration in compressor performance and a power loss by reducing the pressure of the oil passing through the oil recovery passage 56. The refrigerant from which the oil is removed by the oil separator 52 may move to one end of the oil separator 52 and be guided out of the casing 1 through the discharge pipe.

In this process, the decompression mechanism 58 is configured such that the inner diameter of the orifice hole 582*d* varies depending on the pressure in the oil storage chamber 54. Therefore, the pressure in the suction space S1 can be maintained at a predetermined pressure value, with the consequence that it is possible to prevent a deterioration in compressor performance and a power loss due to an increase in pressure in the oil storage chamber 54.

Meanwhile, the pressure of the refrigerant discharged from the compression mechanism 2 is irregular, and thus the pressure in the oil storage chamber 54 may vary. For this reason, if the decompression capacity of the decompression mechanism 58 is fixed regardless of the pressure in the oil storage chamber 54, the oil, which is not sufficiently decompressed, may be introduced into the suction space S1, resulting in a deterioration in compressor performance and a power loss.

Accordingly, in the decompression mechanism 58 according to the present embodiment, the orifice member 582 is made of an elastic material so that the inner diameter of the orifice hole 582*d* varies by deformation and restoration of the orifice member 582 according to the pressure in the oil storage chamber 54.

That is, when the pressure in the oil storage chamber 54 is increased, the orifice member 582 may be compressed in the extension direction of the orifice hole 582*d*. That is, the first tip surface 582*a* may move to the second tip surface 582*b*. In this case, since the second tip surface 582*b* and the outer peripheral surface 582*c* are supported by the support member 586, the orifice member 582 may not expand outward thereof. That is, the second tip surface 582*b* may not move in a direction away from the first tip surface 582*a*, and the outer peripheral surface 582*c* may not move radially outward of the orifice member 582. Instead, the orifice member 582 may expand inward thereof by reaction according to the compression of the orifice member 582. That is, the orifice hole 582*d* may move radially inward thereof, and the inner diameter of the orifice hole 582*d* may be reduced. Thus, the flow rate of oil passing through the orifice member 582 may be reduced, thereby preventing introduction of oil, which is not sufficiently decompressed, into the suction space S1. In addition, since the decompression capacity of the orifice member 582 is improved, the sufficiently decompressed oil may be introduced into the suction space S1.

On the other hand, when the pressure in the oil storage chamber 54 is decreased, the orifice member 582 may be expanded (restored) in the extension direction of the orifice hole 582*d*. That is, the first tip surface 582*a* may move in a direction away from the second tip surface 582*b*. The second tip surface 582*b* and the outer peripheral surface 582*c* are still supported by the support member 586. By reaction according to the expansion (restoration) of the orifice member 582, the orifice hole 582*d* may be moved (restored) radially outward thereof, and the inner diameter of the orifice hole 582*d* may be increased. Thus, the flow rate of oil passing through the orifice member 582 may be increased, and the decompression capacity of the orifice member 582 may be reduced, thereby preventing excessive decompression of oil.

Therefore, the pressure in the suction space S1 can be maintained at a predetermined pressure value, with the consequence that it is possible to prevent a deterioration in compressor performance and a power loss due to a variation in pressure in the oil storage chamber 54.

Here, the second tip surface 582b and outer peripheral surface 582c of the orifice member 582 are supported by the support member 586 so that the orifice member 582 is limitedly expanded outward. Accordingly, the deformation and restoration of the orifice member 582 may effectively bring about a change in inner diameter of the orifice hole 582d.

Although both of the outer peripheral surface 582c and the second tip surface 582b of the orifice member 582 are supported in the present embodiment, the deformation and restoration of the orifice member 582 may bring about a change in inner diameter of the orifice hole 582d even though at least one of the outer peripheral surface 582c and the second tip surface 582b is supported. However, the second tip surface 582b of the orifice member 582 may be preferably supported to prevent the orifice member 582 from being separated downstream of the oil recovery passage 56 from a predetermined position. Both of the outer peripheral surface 582c and the second tip surface 582b of the orifice member 582 may be more preferably supported such that the deformation and restoration of the orifice member 582 bring about a change in inner diameter of the orifice hole 582d.

In the decompression mechanism 58, since the orifice member 582 is made of an elastic material, it is possible to generally embody a compact compressor and reduce costs.

That is, when the pressure in the oil storage chamber 54 is increased, the inner diameter of the orifice hole 582d is reduced to improve a decompression capacity, as described above. Therefore, the orifice member 582 according to the present embodiment may have a shorter length than an orifice member that has a similar decompression capacity and is made of a rigid material. Indeed, the orifice member 582 according to the present embodiment is configured such that the length of the orifice member 582 (the length of the orifice hole 582d) is smaller than or equal to thirty times the inner diameter of the orifice hole 582d, as described above. This length of the orifice member 582 is significantly shorter than an orifice member that has a similar decompression capacity and is made of a rigid material. Thus, the overall length of the decompression mechanism 58 may be short, and the length of the oil recovery passage 56 may be short. Therefore, it is possible to generally embody a compact compressor and reduce the total weight and manufacturing cost of the compressor.

In addition, this elastic material is cheaper than the rigid material and is easily processed. Therefore, the orifice member 582 according to the present embodiment can be reduce material costs and processing costs compared to an orifice member made of a rigid material.

It is possible to reduce the number of parts in the decompression mechanism 58, since the support member 582 fixes the filter member 584 to the orifice member 582 while supporting the second tip surface 582b and outer peripheral surface 582c of the orifice member 582. That is, it is necessary to support the second tip surface 582b and outer peripheral surface 582c of the orifice member 582 using any structure to prevent separation of the orifice member 582 and change the orifice hole 582d and to couple the orifice member 582 to the support member 586 for fixing the filter member 584 to the orifice member 582, as described above. In the present embodiment, since the support member 586 includes the first and second walls 5864c and 5864d, the support member 582 may fix the filter member 584 to the orifice member 582 while supporting the second tip surface 582b and outer peripheral surface 582c of the orifice member 582. Thus, since there is no need to separately include a component for fixing the filter member 584 to the orifice member 582 and a component for support the second tip surface 582b and outer peripheral surface 582c of the orifice member 582, it is possible to reduce the number of parts, simplify the structure of the compressor, and reduce the weight and cost of the compressor.

Figure 6:
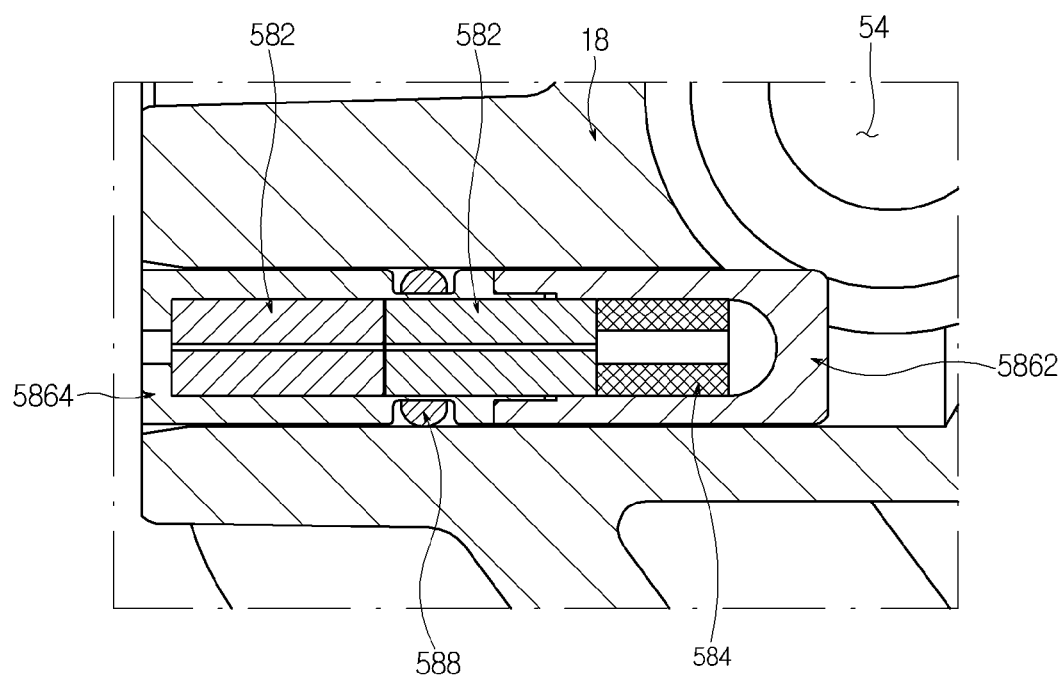
FIG. 6 is a perspective view illustrating a decompression mechanism in a compressor according to another embodiment of the present invention.
Figure 7:
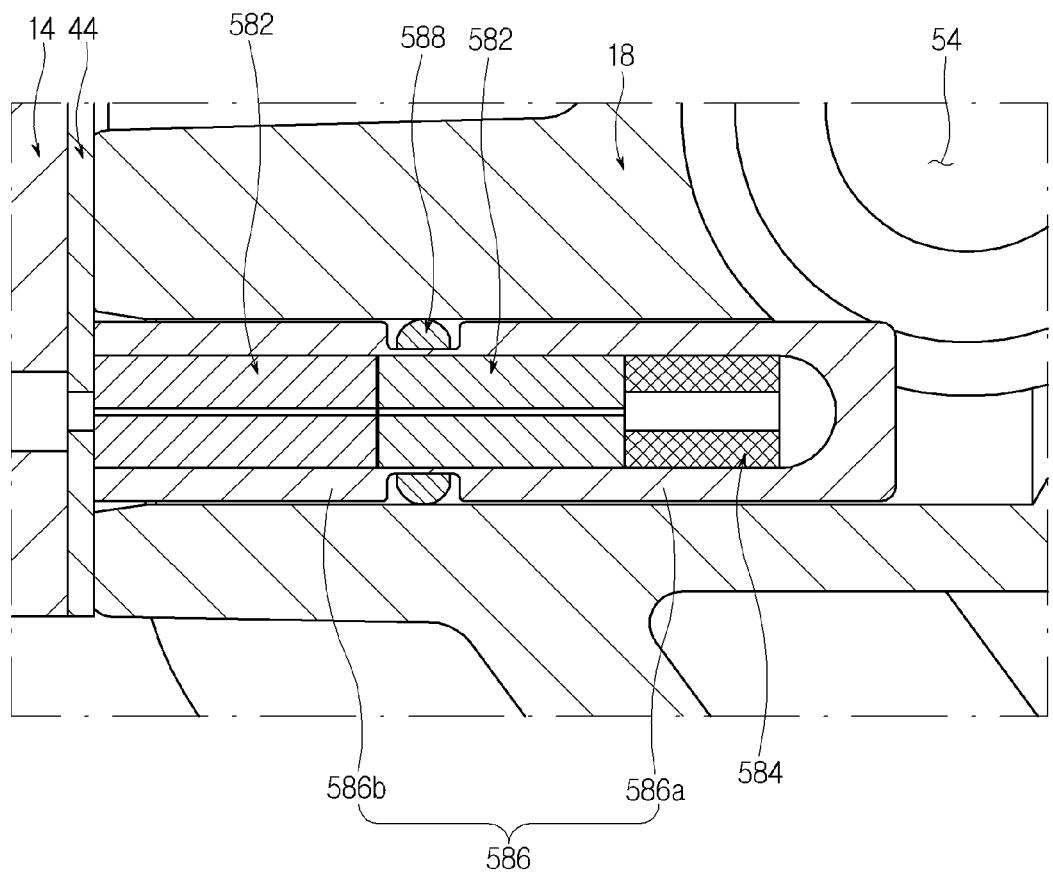
FIG. 7 is a perspective view illustrating a decompression mechanism in a compressor according to a further embodiment of the present invention.

Meanwhile, although a single orifice member 582 is provided in the above-mentioned embodiment, the orifice member 582 may consist of a plurality of orifice members according to the discharge pressure specification of the compressor (the pressure specification of the oil storage chamber 54), as illustrated in FIG. 6. That is, when the pressure in the oil storage chamber 54 is within a predetermined first pressure range, a single orifice member 582 may be provided. When the pressure in the oil storage chamber 54 is within a predetermined second pressure range higher than the first pressure range, a plurality of orifice members 582 may be provided. In this case, the plurality of orifice members 582 may be arranged in the extension direction of orifice holes 582d, and the orifice holes 582d of the plurality of orifice members 582 may communicate with each other. Thus, it is possible to improve the decompression capacity of the decompression mechanism 58 so as to correspond to the pressure in the oil storage chamber 54 by increasing the overall lengths of the orifice holes 582d. Here, the number of orifice members may be properly adjusted in consideration of the pressure specification of the oil storage chamber 54 and the receiving capacity of the support member 586.

Figure 8:
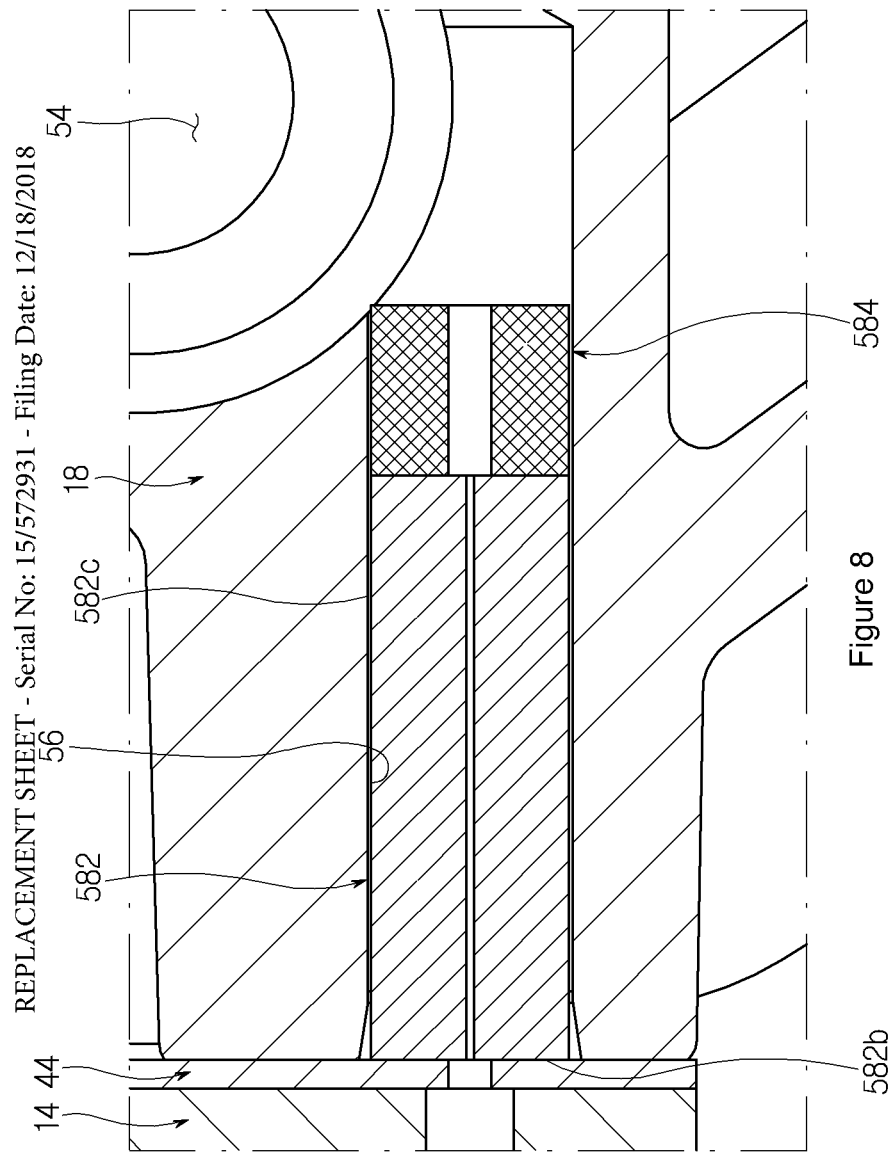
FIG. 8 is a perspective view illustrating a decompression mechanism in a compressor according to another embodiment of the present invention.

Meanwhile, the support member 586 is provided in the above-mentioned embodiment. However, although not separately illustrated in the drawings, the filter member 584 may be fixed to the rear casing 18, and the orifice member 582 may be supported by the oil recovery passage 56, without including the support member 586. That is, as shown in FIG. 8, the outer peripheral surface 582c of the orifice member 582 may be supported by the inner wall of the oil recovery passage 56, and the second tip surface 582b of the orifice member 582 may be supported by the valve (more exactly, the second valve 44) of the compression mechanism 2. In this case, since the support member 586 is removed, it is possible to reduce the number of parts and reduce the weight and cost of the compressor, compared to the above-mentioned embodiment.

Meanwhile, the support member 586 is provided in the above-mentioned embodiment. However, although not separately illustrated in the drawings, the filter member 584 may be fixed to the rear casing 18, and the orifice member 582 may be supported by the oil recovery passage 56 without including the support member 586. That is, the outer peripheral surface 582c of the orifice member 582 may be supported by the inner wall of the oil recovery passage 56, and the second tip surface 582b of the orifice member 582 may be supported by the valve (more exactly, the second valve 44) of the compression mechanism 2. In this case, since the support member 586 is removed, it is possible to reduce the number of parts and reduce the weight and cost of the compressor, compared to the above-mentioned embodiment.

Meanwhile, although the compressor including the so-called double-headed swash plate 22 is described, for example, in the above-mentioned embodiment, the decompression mechanism 58 according to the present embodiment may be applied to other compressors (for instance, a scroll compressor, a reciprocating compressor, an electric compressor, etc.). That is, in a compressor including a compression mechanism 2 that sucks and compresses a refrigerant from a suction space S1 to discharge the refrigerant to a discharge space S2 by the driving force transmitted thereto, an oil storage chamber 54 that is provided in the discharge space S2 to collect oil separated from the refrigerant discharged from the compression mechanism 2, and an oil recovery passage 56 that guides the oil in the oil storage chamber 54 to the suction space S1, the oil recovery passage 56 is provided with a decompression mechanism 58 that reduces the pressure of the oil passing through the oil recovery passage 56 by an orifice hole 582*d* having an inner diameter smaller than the oil recovery passage 56, and the decompression mechanism 58 may be configured such that, when the pressure in the oil storage chamber 54 is increased, the inner diameter of the orifice hole 582*d* is reduced. When the pressure in the oil storage chamber 54 is reduced, the inner diameter of the orifice hole 582*d* is increased.

INDUSTRIAL APPLICABILITY

The present invention relates to a compressor capable of separating oil from a refrigerant, which is compressed and discharged, and decompressing and recovering the separated oil. Accordingly, it is possible to sufficiently decompress the oil recovered to a suction space from a discharge space even when the pressure in the discharge space is increased.

The invention claimed is:

1. A compressor comprising:
   a compression mechanism configured to suck and compress a refrigerant from a suction space to discharge the refrigerant to a discharge space by a driving force transmitted thereto;
   an oil storage chamber provided in the discharge space to collect oil separated from the refrigerant discharged from the compression mechanism;
   an oil recovery passage configured to guide the oil in the oil storage chamber to the suction space; and
   a decompression mechanism provided in the oil recovery passage to reduce a pressure of the oil passing through the oil recovery passage by an orifice hole having an inner diameter smaller than the oil recovery passage, wherein the decompression mechanism comprises:
      a filter member configured to separate foreign substances from the oil introduced into the orifice hole,
      an orifice member having the orifice hole formed therein, and the orifice member is made of an elastic material, the orifice member comprising a first tip surface having an annular shape, a second tip surface having an annular shape and forming a back surface of the first tip surface, an outer peripheral surface connecting an outer peripheral portion of the first tip surface to an outer peripheral portion of the second tip surface, and an inner peripheral surface connecting an inner peripheral portion of the first tip surface to an inner peripheral portion of the second tip surface, and forming the orifice hole, wherein the first tip surface is positioned upstream of the oil recovery passage, the second tip surface is positioned downstream of the oil recovery passage, and at least one of the second tip surface and the outer peripheral surface is fixedly supported, and
      a support member configured to fix the filter member to the orifice member, wherein the support member comprises a first support member configured to cover the first tip surface of the orifice member, the filter member being installed to the first support member, and a second support member coupled to the first support member to support the second tip surface and the outer peripheral surface of the orifice member, and
   wherein the decompression mechanism is configured such that, when a pressure in the oil storage chamber is increased, the inner diameter of the orifice hole is reduced.

2. The compressor according to claim 1, wherein, when the pressure in the oil storage chamber is designed to fall within a predetermined first pressure range, the orifice member is a single orifice member, and when the pressure in the oil storage chamber is designed to fall within a predetermined second pressure range higher than the first pressure range, the orifice member consists of a plurality of orifice members.

3. The compressor according to claim 2, wherein the plurality of orifice members are arranged in an extension direction of orifice holes, and the orifice holes of the plurality of orifice members communicate with each other.

4. The compressor according to claim 1, wherein the first support member and the second support member are detachably formed, and the second support member is configured such that the orifice member is inserted into the second support member from the first support member.

5. A compressor comprising:
   a compression mechanism configured to suck and compress a refrigerant from a suction space to discharge the refrigerant to a discharge space by a driving force transmitted thereto;
   an oil storage chamber provided in the discharge space to collect oil separated from the refrigerant discharged from the compression mechanism;
   an oil recovery passage configured to guide the oil in the oil storage chamber to the suction space; and
   a decompression mechanism provided in the oil recovery passage to reduce a pressure of the oil passing through the oil recovery passage by an orifice hole having an inner diameter smaller than the oil recovery passage, wherein the decompression mechanism comprises:
      a filter member configured to separate foreign substances from the oil introduced into the orifice hole,
      an orifice member having the orifice hole formed therein, and the orifice member is made of an elastic material, the orifice member comprising a first tip surface having an annular shape, a second tip surface having an annular shape and forming a back surface of the first tip surface, an outer peripheral surface connecting an outer peripheral portion of the first tip surface to an outer peripheral portion of the second tip surface, and an inner peripheral surface connecting an inner peripheral portion of the first tip surface to an inner peripheral portion of the second tip surface, and forming the orifice hole, wherein the first tip surface is positioned upstream of the oil recovery passage, the second tip surface is positioned downstream of the oil recovery passage, and at least one of the second tip surface and the outer peripheral surface is fixedly supported, and
      a support member configured to fix the filter member to the orifice member, wherein the support member comprises a first portion configured to cover the first tip surface of the orifice member, the filter member being installed to the first portion and a second portion extending from the first portion and supporting the outer peripheral surface of the orifice member, and wherein the decompression mechanism is configured such that, when a pressure in the oil storage chamber is increased, the inner diameter of the orifice hole is reduced.

6. The compressor according to claim 5, wherein the first portion and the second portion are formed integrally, and the second portion is configured such that the orifice member is inserted into the second portion from an opposite side of the first portion.

7. The compressor according to claim 5, wherein the second tip surface of the orifice member is supported by a valve of the compression mechanism.

8. A compressor comprising:
a compression mechanism configured to suck and compress a refrigerant from a suction space to discharge the refrigerant to a discharge space by a driving force transmitted thereto;
an oil storage chamber provided in the discharge space to collect oil separated from the refrigerant discharged from the compression mechanism;
an oil recovery passage configured to guide the oil in the oil storage chamber to the suction space; and
a decompression mechanism provided in the oil recovery passage to reduce a pressure of the oil passing through the oil recovery passage by an orifice hole having an inner diameter smaller than the oil recovery passage, wherein the decompression mechanism comprises an orifice member having the orifice hole formed therein, and the orifice member is made of an elastic material, the orifice member comprising:
a first tip surface having an annular shape,
a second tip surface having an annular shape and forming a back surface of the first tip surface,
an outer peripheral surface connecting an outer peripheral portion of the first tip surface to an outer peripheral portion of the second tip surface, and
an inner peripheral surface connecting an inner peripheral portion of the first tip surface to an inner peripheral portion of the second tip surface, and forming the orifice hole, wherein the first tip surface is positioned upstream of the oil recovery passage, wherein the second tip surface is positioned downstream of the oil recovery passage, at least one of the second tip surface and the outer peripheral surface is fixedly supported, and
wherein the outer peripheral surface of the orifice member is supported by an inner wall of the oil recovery passage, and the second tip surface of the orifice member is supported by a valve of the compression mechanism,
wherein the decompression mechanism is configured such that, when a pressure in the oil storage chamber is increased, the inner diameter of the orifice hole is reduced.

* * * * *